United States Patent [19]

Fischer et al.

[11] Patent Number: 5,692,658
[45] Date of Patent: Dec. 2, 1997

[54] HOLDER FOR DRINK CONTAINERS

[75] Inventors: Heinz Fischer, Waldachtal; Ulrich Nienhaus, Nagold; Bernd Schenk, Horb, all of Germany

[73] Assignees: fischerwerke, Artur Fischer GmbH & Co. KG; Mercedes Benz AG, both of Stuttgart, Germany

[21] Appl. No.: 574,112

[22] Filed: Dec. 18, 1995

[30] Foreign Application Priority Data

Dec. 16, 1994 [DE] Germany ............... 44 44 955.0

[51] Int. Cl.⁶ ............... B60R 7/06; B60N 3/10
[52] U.S. Cl. ............... 224/281; 224/483; 224/282; 224/926; 248/311.2
[58] Field of Search ............... 224/926, 483, 224/281, 282, 544, 542; 248/311.2; 297/188.17, 188.16, 188.15

[56] References Cited

U.S. PATENT DOCUMENTS 4,953,771  9/1990  Fischer et al. .
5,228,611  7/1993  Yabuya ................... 224/926

*Primary Examiner*—Linda J. Sholl
*Attorney, Agent, or Firm*—Michael J. Striker

[57] ABSTRACT

A holder for drink containers in a motor vehicle has a slider member that can be pulled out and on which are mounted pivot arms which, when pulled out, pivot laterally outward, and which, with cut-away portions in the slider member, form insertion openings for drink containers, and has supports which pivot downwards when the slider member is pulled out. In order to support securely drink containers of different sizes which are inserted, the supports are pivoted outward, forcibly controlled, by the pivot arms through half the pivot angle of the pivot arms.

6 Claims, 5 Drawing Sheets

HOLDER FOR DRINK CONTAINERS

BACKGROUND OF THE INVENTION

The present invention relates to a holder for drink containers, such as cups, beakers or drink cans, which is provided for installation in a motor vehicle.

A holder of this type is known from U.S. Pat. No. 4,953,771. The known holder is provided for fitting in a fascia of a motor vehicle. If it is not being used, it can be recessed in the fascia, and its front face then closes flush with the fascia and only a grip means protrudes into the passenger compartment.

The known holder has a slider member which can be pulled out of the fascia, like a drawer, into an open position, a rearward part of the slider member always remaining guided in the fascia. Mounted on the slider member are two pivot arms which are pivoted laterally outward away from each other by a common spring when the slider member is opened. A forward region of the pivot arms is swung in an arc of a circle. When the pivot arms are pivoted out, if forms with a recess, in the shape of an arc of a circle, of the slider member an insertion opening for one drink container at a time.

If the slider member is pushed into the fascia, the pivot arms come to bear against a side edge of an opening in the fascia receiving the slider member, and are pressed inward so that they do not project laterally beyond the slider member. The pivot arms are recessed, together with the slider member, in the fascia. By means of the lateral pivoting ability of the pivot arms, the installation width necessary for the holder is reduced.

In order to be able to place different cups and beakers, and also drink cans, in the known holder, the latter has a support which is pivotally mounted on the slider member and, when the slider member is pulled out, assisted by spring force, pivots downwards under its own weight. When the slider member is pushed into the fascia, the support comes to bear against a lower edge of the opening for the slider member in the fascia, and is pivoted upwards. In this way, the installation height necessary for the known holder is reduced.

A drawback of the known holder is that the width of its support is limited by the installation width of the holder, and the support projects only a little way beneath a drink container placed in the holder. The supporting of a drink container placed in the holder consequently depends on the actual drink container, especially on its diameter, and is not sufficiently secure in every case. In the case of vibration of the motor vehicle or careless placing of the drink container in the holder, for example while travelling, the drink container can drop down.

SUMMARY OF THE INVENTION

It is therefore an object of the present invention to provide a holder of the above mentioned general type, which is designed so that inserted drink containers of different shapes and sizes, especially of different diameters or transverse dimensions, are held securely.

In keeping with these objects and with others which will become apparent hereinafter, one feature of the present invention resides, briefly stated, in a holder for drink containers in a motor vehicle, having a slider member which can be moved from a closed position into an open position like a drawer, and on which are mounted a pivot arm, which when the slider member is pulled out, pivots out, projects partially laterally beyond the slider member, and thereby forms, together with the slider member, an insertion opening for the drink container, and also a support for the drink container.

By means of the support pivoting out laterally together with the pivot arm, through a smaller angle than the latter, central and thus secure supporting of the base portion of an inserted drink container is obtained. In the holder according to the invention, the support can have a large surface area in order always to ensure reliable supporting of an inserted drink container. A drink container of small diameter, which has lateral room for movement in the insertion opening, also stands securely on the support, independently of its position in the insertion opening.

In the embodiments of the invention, a spring element moves the slider member into its open position, after it has been unlocked by actuation of a button or the like. The slider member is pushed in against the force of the spring. Tension springs or compression springs are especially suitable as the spring element. In an advantageous form of the invention, the spring element is a scroll spring. This is a spring element in the form of a strip, one end of which winds up into a roll because of its elasticity, and thereby produces a tensile force. A scroll spring has the advantage that its spring force is practically constant over the entire spring travel.

In embodiments of the invention, the opening movement of the slider member is damped by a fluid damping element which is known per se.

In a preferred form of the invention, the pivot arm is pivoted out laterally by means of a spring element.

The support of the holder according to the invention is preferably guided forcibly by its slider member in a lateral direction, and thereby pivots out laterally, together with the pivot arm, when the slider member is pulled out, and pivots back again when the slider member is pushed in. The pivot angle of the support is smaller than the pivot angle of the pivot arm. Preferably, the pivot angle of the support is half that of the pivot arm, so that the support, when pivoted out, is located centrally beneath the insertion opening.

In a preferred form, the holder according to the invention is provided for the placing of two drink containers next to each other. For this purpose, it has two pivot arms and two supports, which pivot out away from each other on both sides of the slider member when the slider member is pulled out.

In a preferred form of the invention, the holder has a housing in which the slider member is housed with the pivot arms and the supports so as to be able to be pulled out. By this means, a complete constructional unit is obtained which can be installed in an opening, for example in the fascia, in a door lining, or in an arm-rest, of a motor vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows the slider member from FIG. 2 with the pivot arms and supports pivoted in;

DESCRIPTION OF THE PREFERRED EMBODIMENTS

Figure 1:
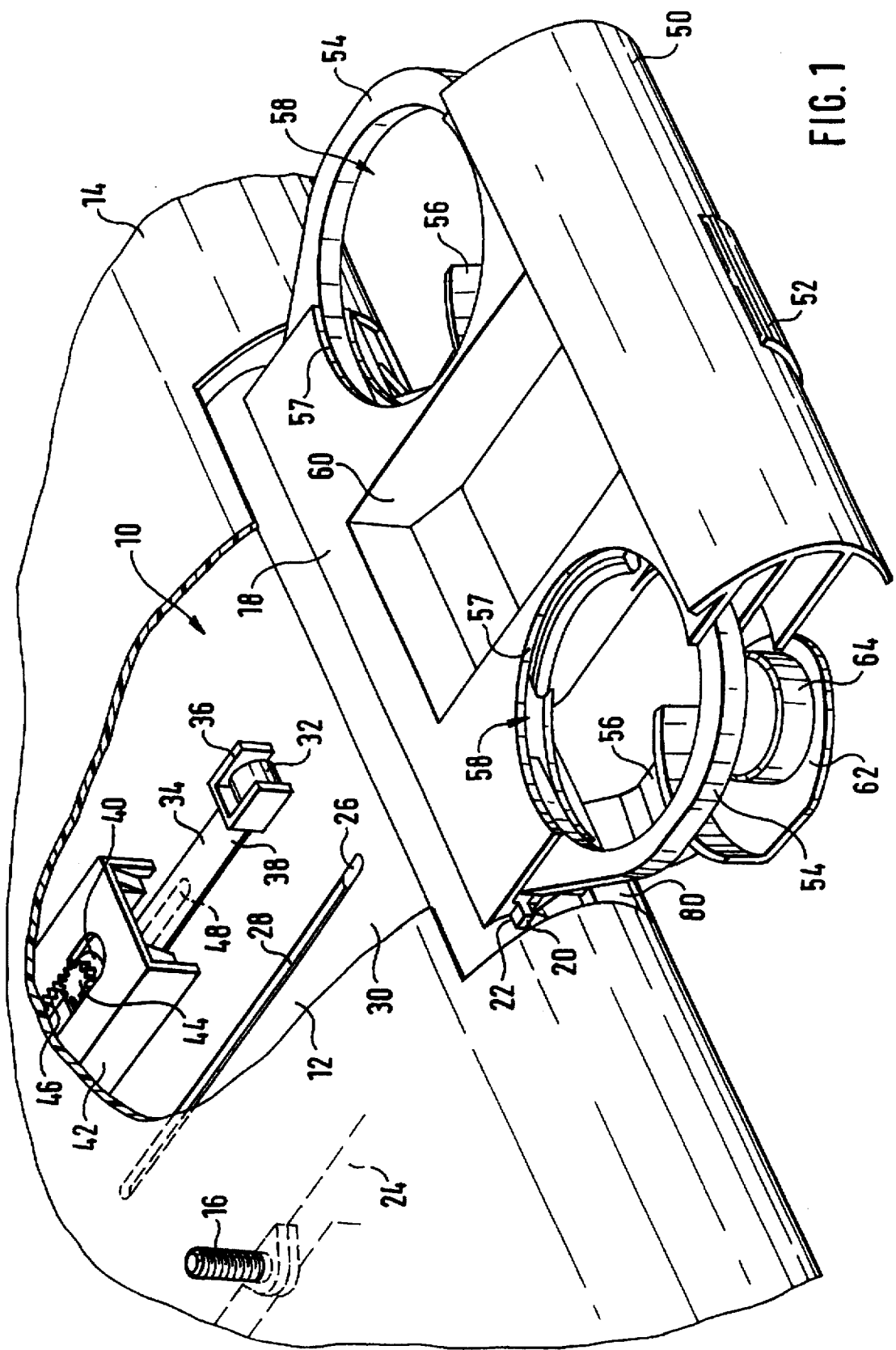
FIG. 1 is a perspective view of a holder according to the invention, which is mounted in a fascia of a motor vehicle.

The holder according to the invention, illustrated in FIG. 1 and designated as a whole by 10, has a flat housing 12 which is installed in a fascia 14, which is merely indicated, of a motor vehicle. The housing 12 is an injection-molded part of plastics material. It is screwed to the inside of the fascia 14 by screws 16, only one of which is visible in FIG. 1.

A slider member 18, which is likewise produced as an injection-molded part of plastics material, is guided in the housing 12 so that it can be pulled out like a drawer. For this purpose it has two laterally projecting slide rails 20 which are mounted in siding grooves 22 in side walls 24 of the housing 12.

In order to limit the distance to which the slider member 18 can be pulled out, it has two lugs 26, projecting from its upper side, which engage in longitudinal slots 28, closed at both ends, in an upper wall 30, and limit the displacement of the slider member (in FIG. 1, only a left-hand lug 26 can be seen in a left-hand longitudinal slot 28).

A roll 32 of a scroll spring 34, which consists of a sheet metal strip, is accommodated in a recess 36, integral with the housing 12, on the upper wall 30 of the latter. An unrolled strip end 38 of the scroll spring 34 extends through a slot, not visible in the drawing, in the recess 36, over the upper wall 30 of the housing 12 to a fluid damping element 40, which engages through a longitudinal slot 48 in the upper wall 30 of the housing 12 and is engaged with the slider member 18. The scroll spring 34 pulls the slider member 18 out of the housing 12 into an extended position shown in FIG. 1.

The fluid damping element 40 is guided in a tunnel-like longitudinal guide 42 on the upper wall 30 of the housing 12. A gear wheel 44 on a fluid-damped shaft of the fluid damping element 40 engages with a toothed rack 46 of the longitudinal guide 42 and in this way damps the movement of the slider member 18.

On a front side of the slider member 18 is mounted a cover piece 50 which, when the slider member 18 is pushed into the housing 12, closes flush with the fascia 14. By means of a button 52, which is arranged in the cover piece 50, the slider member 18 can be unlocked and is pushed by the scroll spring 34 out of the housing 12 and the fascia 14 into the open position shown in FIG. 1.

On the slider member 18 are mounted two pivot arms 54 which, when the slider member 18 is open, are pivoted laterally out of the latter. A forward region of the pivot arm 54 is in the shape of an arc of a circle. Together with circular cut-away portions 57 in the slider member 18, it forms in each case a respective insertion opening 58 for drink containers. Between the insertion openings 58, the slider member 18 has a trough-like tray compartment 60.

Furthermore, on the slider member 18 are pivotally mounted two supports 56 which, when the slider member 18 is pulled out, are pivoted downwards and laterally outward. By means of the pivoting-out of the supports 56, a setting-down surface 62 of each support 56 moves into the center beneath the respective insertion opening 58. On the setting-down surface 62 there is a circular raised portion 64 on which a drink container inserted into the holder 10 according to the invention stands.

Figure 2:
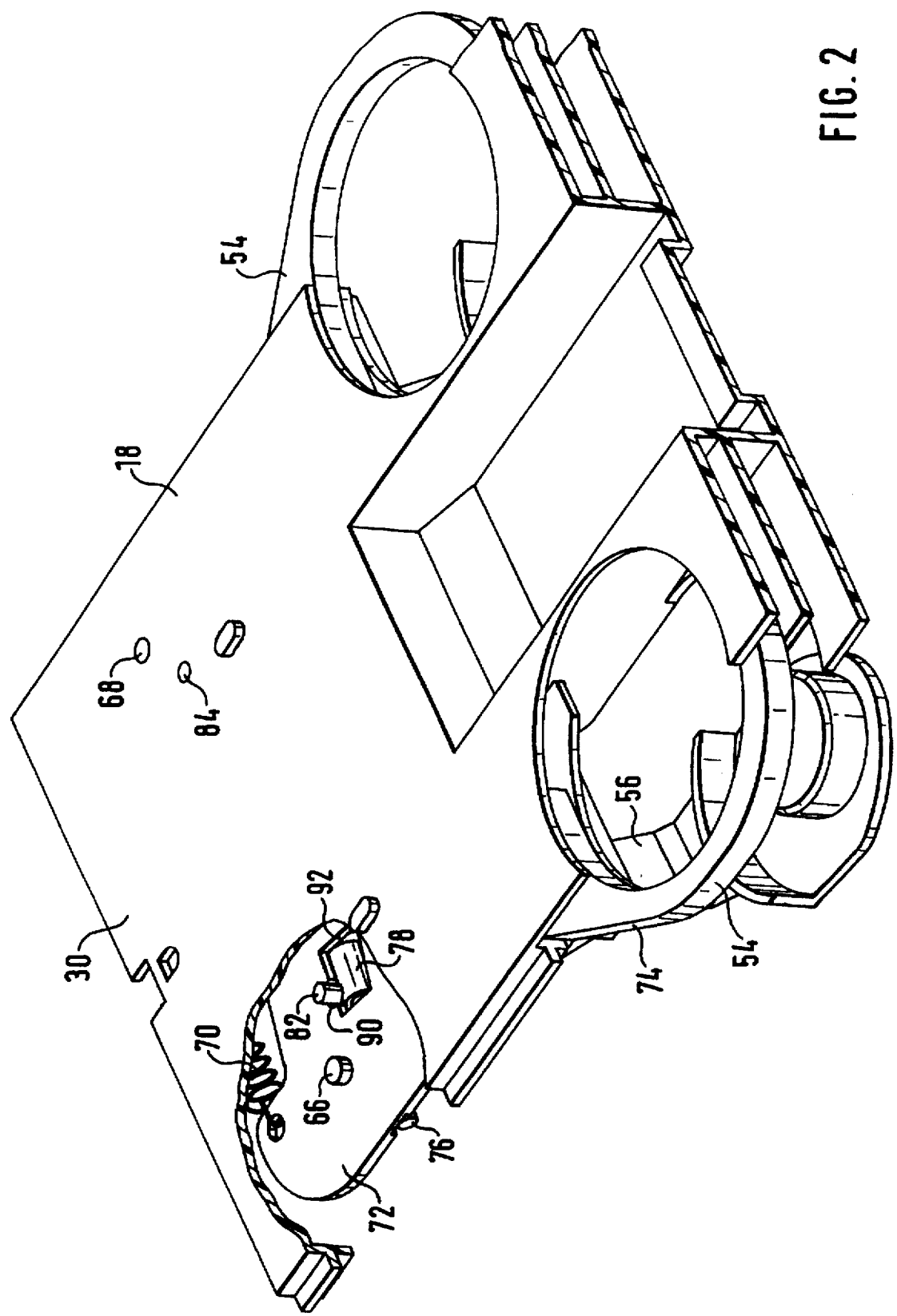
FIG. 2 is a perspective view of a slider member of the holder according to the invention in FIG. 1, with the pivot arms and supports pivoted out.
Figure 3:
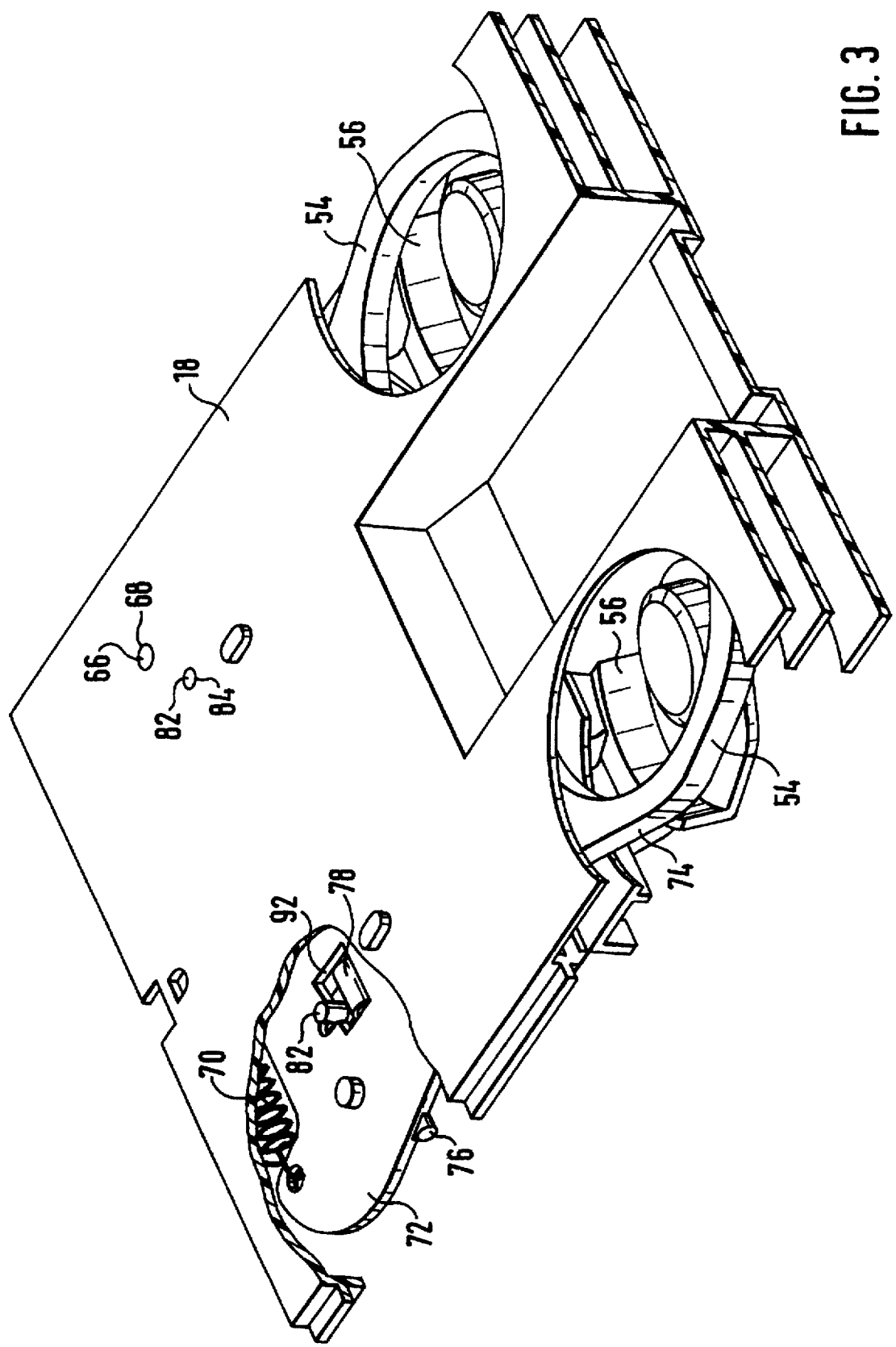
Figure 4:
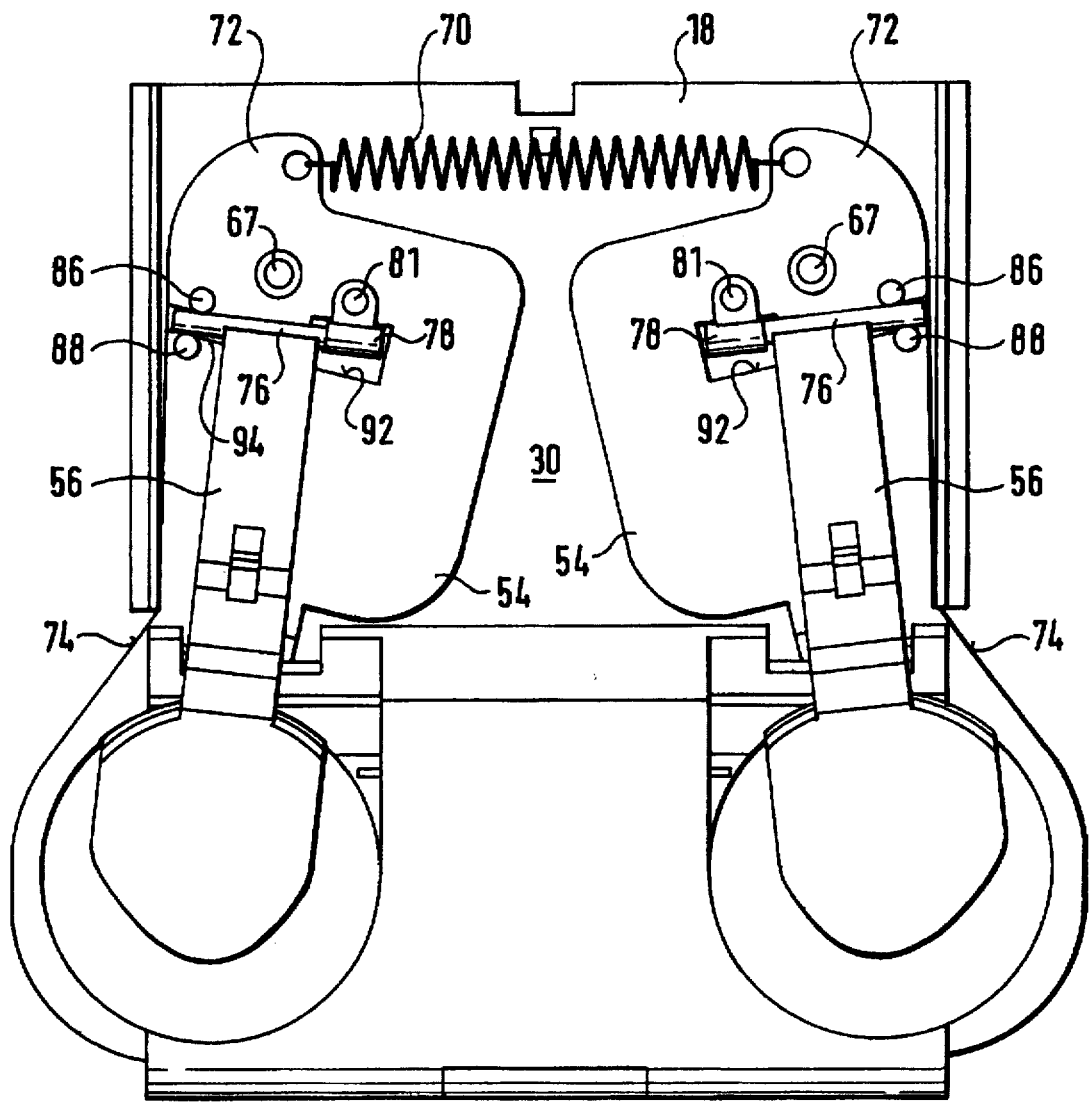
FIG. 4 is a view from below of the slider member according to FIG. 2.
Figure 5:
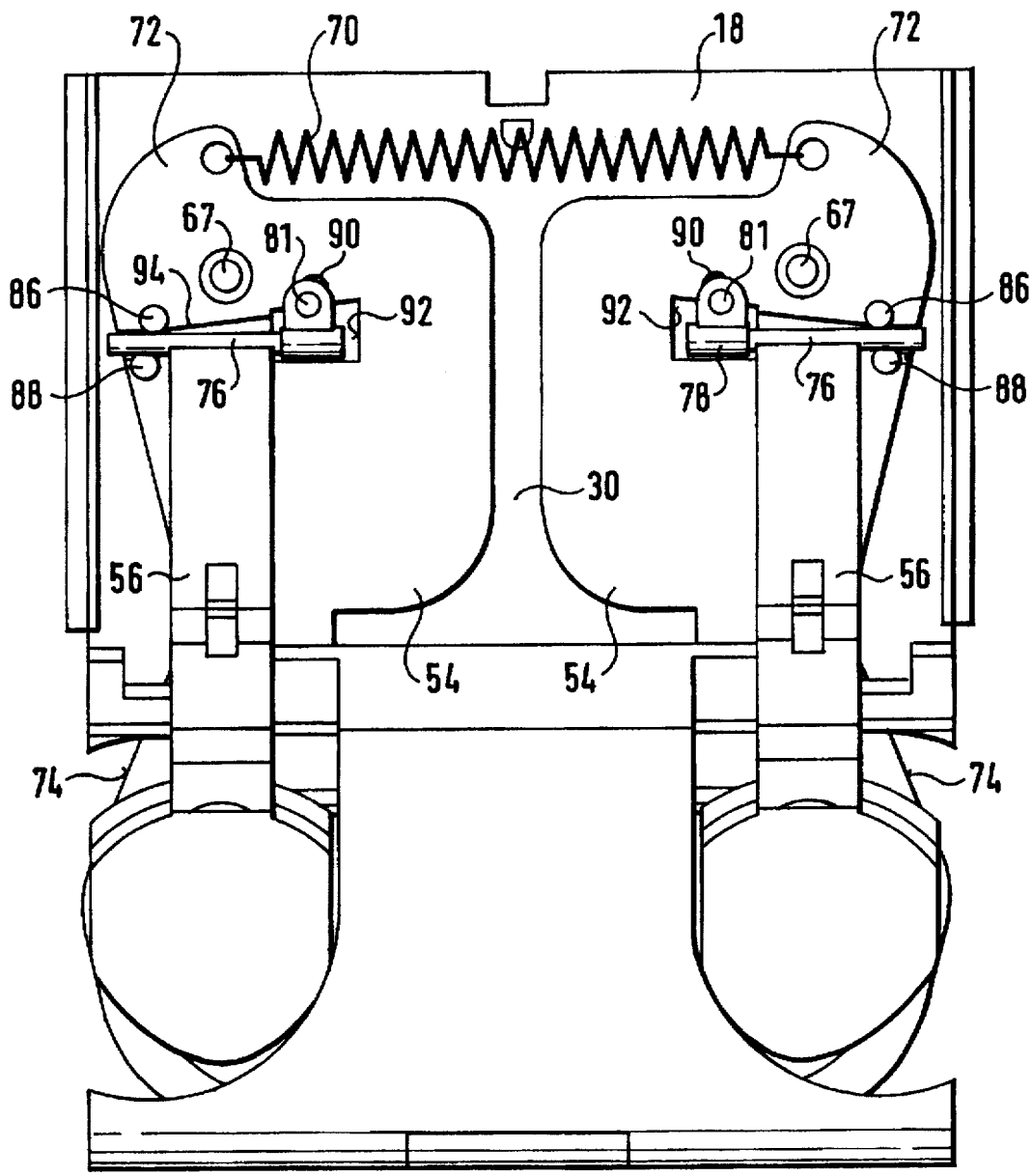
FIG. 5 is a view from below of the slider member according to FIG. 3.

The pivoting mechanism of the holder 10 according to the invention is described hereinafter with reference to FIGS. 2 to 5, the pivot arms 54 in FIGS. 2 and 4 being pivoted out and the supports 56 being pivoted downwards and outward. In FIGS. 3 and 5, the pivot arms 54 are pivoted inward and the supports 56 are pivoted upwards and inward. In FIGS. 4 and 5, a lower wall of the slider member 18 is omitted.

The pivot arms 54 extend into a rearward region of the slider member 18, where they are pivotally mounted by trunnions 66, 67 which engage in bores 68 which are provided in the upper wall 30 and in the lower wall of the slider member 18. A helical tension spring 70 pulls rear ends 72 of the pivot arms 54 together and thereby has the effect that the forward part of the pivot arms 54 pivots to the side out of the slider member 18. When the slider member 18 is pushed in, oblique surfaces 74 on outer sides of the pivot arms 54 come to bear against the side walls 24 of the housing 12 (FIG. 1) and are thereby pivoted inward. In this position they do not project laterally beyond the slider member 18 (FIG. 5).

The supports 56 are pivotally mounted in the slider member 18 about a vertical and about a horizontal axis; they have in the rearward region of the slider member 18 a horizontally arranged pivot shaft 76 extending approximately transversely to the slider member 18 and to the pivot arms 54. An end of the pivot shaft 76 pointing in the direction of the inside of the slider member 18 is mounted in a bearing shoe 78 which makes possible a pivoting movement of the supports 56 out of the upper position shown in FIG. 3 into the lower position shown in FIGS. 1 and 2. The supports 56 pivot downwards by their own weight. They bear on a lower edge 80 (FIG. 1) of the housing 12, which limits their downward pivoting movement and which pushes them upwards when the slider member 18 is pushed into the housing 12.

To support the supports 56 so as to be pivotable in a lateral direction, the bearing shoe 78 has a downwardly-projecting and an upwardly-projecting pin 81, 82 which engages in a bore 84 in the upper wall 30 and in a bore, on the same axis and not visible, in the lower wall of the slider member 18. An end, remote from the bearing shoe 78, of the pivot shaft 76 is held between two pegs 86, 88 (FIGS. 4 and 5). This pivot shaft end, during the pivoting movement of the pivot arm 54, is moved with the latter, so that the supports 56 are driven to their lateral pivoting movement. Owing to the arrangement of the pivot pins 81, 82 of the supports 56 in relation to the trunnions 66, 67 of the pivot arms 54, and the driver pegs 86, 88, driving the pivot shaft 76, of the pivot arms 54, the pivot angle of the supports 56 is half that of the pivot arms 54.

The pivot arms 54 have a short recess 90, extending tangentially to their trunnions 66, through which recess the upper pivot pin 82 of the support 56 passes. The recess 90 makes possible the pivoting movement of the pivot arms 54 with respect to the pivot pin 82, mounted in the slider member 18, of the supports 56. The cut-away portion 90 merges into a larger cut-away portion 92 in which there is room for the bearing shoe 78. A transverse groove 94 in the underside of the pivot arms 54 provides space for the pivot shaft 76 of the supports 56.

It will be understood that each of the elements described above, or two or more together, may also find a useful application in other types of constructions differing from the types described above.

While the invention has been illustrated and described as embodied in a holder for drink containers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A holder for drink containers in a motor vehicle, comprising a slider member moveable from a closed position into an open position; a pivot arm mounted on said slider member so that when said slider member is pulled out said pivot arm pivots out through a pivot angle projecting partially laterally beyond said slider member an insertion opening for the drink containers; and a support pivotable downwards when said slider member is pulled out, so that said support, on being pulled out, pivots outwardly laterally through an angle which is smaller than said pivot angle of said pivot arm, said pivot arm has trunnions; and further comprising driving pegs arranged on said pivot arm; and a pivot shaft rigidly connected with said support and pivotable by said driver pegs and said pivot pins relative to said pivot arm.

2. A holder as defined in claim 1; and further comprising a spring element which pivots out said pivot arm.

3. A holder as defined in claim 1, wherein said support is pivoted laterally, forcibly guided by said slider member.

4. A holder as defined in claim 1, wherein said pivot arm is pivotable through a predetermined pivot angle, said support being pivotable through half of said pivot angle of said pivot arm.

5. A holder as defined in claim 1; and further comprising a second such pivot arm and a second such support, said pivot arms being pivotable in diametrically opposite directions, said supports being each associated with a respective one of said pivot arms.

6. A holder as defined in claim 1; and further comprising a housing for installation in a motor vehicle, said slider member being mounted in said housing so as to be pullable out.

* * * * *